US006655635B2

United States Patent
Maury et al.

(10) Patent No.: US 6,655,635 B2
(45) Date of Patent: Dec. 2, 2003

(54) AIRCRAFT WITH VENTRAL FAIRING AND SEAL FOR SUCH AN AIRCRAFT

(75) Inventors: Jean-Pierre Maury, Pelleport (FR); Alain Milhau, Frouzins (FR); Bernard Pauly, Blagnac (FR)

(73) Assignee: Airbus France, Toulouse (FR)

(*) Notice: Subject to any disclaimer, the term of this patent is extended or adjusted under 35 U.S.C. 154(b) by 0 days.

(21) Appl. No.: 10/212,065

(22) Filed: Aug. 6, 2002

(65) Prior Publication Data

US 2003/0066933 A1 Apr. 10, 2003

(30) Foreign Application Priority Data

Oct. 5, 2001 (FR) ............................. 01 12829

(51) Int. Cl.$^7$ .................................. B64C 1/00
(52) U.S. Cl. .................... 244/131; 244/117 R; 244/119
(58) Field of Search ............... 244/117 R, 119, 244/120, 123, 124, 131, 130

(56) References Cited

U.S. PATENT DOCUMENTS

| | | | | |
|---|---|---|---|---|
| 2,616,509 A | * | 11/1952 | Thomas | 416/84 |
| 3,023,860 A | * | 3/1962 | Ellzey | 244/120 |
| 3,499,622 A | * | 3/1970 | Lugan et al. | 244/130 |
| 3,756,529 A | | 9/1973 | Backlund et al. | 244/87 |
| 4,034,939 A | | 7/1977 | Ridley, Jr. et al. | 244/87 |
| 4,399,998 A | * | 8/1983 | Otto | 277/552 |
| 5,114,162 A | | 5/1992 | Ditcher | 277/605 |
| 5,727,839 A | * | 3/1998 | Ruhringer et al. | 296/213 |
| 6,581,877 B2 | * | 6/2003 | Pauly | 244/131 |

FOREIGN PATENT DOCUMENTS

| | | |
|---|---|---|
| DE | 4443525 | 2/1996 |
| DE | 29713153 | 9/1997 |
| FR | 2569455 | 2/1986 |
| FR | 2789144 | 8/2000 |
| FR | 2793538 | 11/2000 |

* cited by examiner

*Primary Examiner*—Charles T. Jordan
*Assistant Examiner*—Daniel Matz
(74) *Attorney, Agent, or Firm*—Stevens, Davis, Miller & Mosher, LLP

(57) ABSTRACT

An aircraft includes a fuselage and a fixed flying surface having two wings, and a cradle-shaped ventral fairing at the crossover of the latter with the flying surface and provided with two longitudinal flanges climbing laterally along the fuselage and being provided with an opening for the passage with play of the corresponding wing to form a first peripheral slot around the ventral fairing and a second peripheral slot around each wing. An elongate seal is fixed to the periphery of the ventral fairing and to the periphery of each opening, so at to shut off the first and second slots, respectively. The seal includes a longitudinal elastic end lip applied, via the inner face of its free end, respectively against the fuselage or the flying surface and a longitudinal leaktightness member, carried by the inner face of the seal set back with respect to the end lip and also able to be applied against the fuselage or flying surface, respectively. The additional longitudinal leaktightness member is radially elastic bead.

12 Claims, 5 Drawing Sheets

AIRCRAFT WITH VENTRAL FAIRING AND SEAL FOR SUCH AN AIRCRAFT

BACKGROUND OF THE INVENTION

The present invention relates to an aircraft with ventral fairing, as well as to a seal for such an aircraft.

DESCRIPTION OF THE PRIOR ART

It is known that certain aircraft, provided with a fuselage and with a fixed flying surface comprising two wings opposite one another with respect to said fuselage, comprise a cradle-shaped ventral fairing, generally projecting, which is fixed to the lower part of said fuselage at the crossover of the latter with said flying surface so as to shut off the landing gear bay by increasing possibly the bottomward volume thereof, and which possesses two longitudinal flanges climbing laterally along said fuselage, said flanges being provided, each, with an opening for the passage of the corresponding wing. Such a fairing supplements the aerodynamic profile of the crossover zone and its shape is tailored to minimize the aerodynamic drag to which it gives rise.

In certain known aircraft, the mode of fixing this ventral fairing to the fuselage entails the formation of a first peripheral slot around the ventral fairing, between the latter and the fuselage, and of a second peripheral slot around each wing, between the latter and the periphery of the corresponding opening of said fairing. In order to shut off said slots, an elongate seal is then provided, fixed to the periphery of said ventral fairing and to the periphery of each opening thereof.

It will be noted that, in addition to its leaktightness function, said seal must ensure the continuity of the surfaces so as to avoid the occurrence of significant drag and to absorb the relative movements between said fairing, on the one hand, and the flying surface and the fuselage, on the other hand.

To do this, the seals currently used comprise two longitudinal elastic lips able to be applied, via the inner face of their free end, respectively against the fuselage or the flying surface, one of these lips—hereinafter designated the end lip—forming the free end edge of said seal, while the other—hereinafter designated the inner lip—is carried by the inner face of this seal and is disposed set back with respect to said end lip.

Such a known seal exhibits numerous drawbacks. Firstly, during the fitting thereof, the inner lip—which is hidden by the seal itself and/or by the fairing—may turn over, its outer face then bearing on the fuselage or the flying surface instead of its inner face. In this case, the seal can no longer fulfill its function and it wears out very rapidly.

Additionally, in flight, on account of the pressure difference prevailing between the airfoil bottom surface (high pressure) and the airfoil top surface (low pressure) of the flying surface, a circulation of air is set up, between the airfoil bottom surface and the airfoil top surface of each wing, inside the fairing through said first and second slots, thereby causing, in particular on the airfoil top surface side, the detachment of the free end of said elastic lips of said seal, with respect to the fuselage or to the flying surface. Consequently, said elastic lips of the seal begin to vibrate, and do so within a frequency range which is perfectly audible from inside the cabin, this proving to be an inconvenience for the passengers. These vibrations are transmitted to the fuselage and to the elements which it comprises (floor, support, etc) and cause structural fatigue loading of said elements. Moreover, the vibrations, associated with the aerodynamic loads applied to said lips, give rise to their premature fatigue, this being manifested as rapid wear which may even result in their tearing. Finally, these vibrations bring about the occurrence of nuisance aerodynamic drag.

SUMMARY OF THE INVENTION

The object of the present invention is to remedy these drawbacks.

To this end, according to the invention, an aircraft comprising:
- a fuselage and a fixed flying surface comprising two wings opposite one another with respect to said fuselage;
- a cradle-shaped ventral fairing, fixed with play to the lower part of said fuselage, at the crossover of the latter with said flying surface and provided with two longitudinal flanges climbing laterally along said fuselage, said longitudinal flanges being provided, each, with an opening for the passage with play of the corresponding wing, in such a way as to form:
  - a first peripheral slot around said ventral fairing, between the latter and said fuselage; and
  - a second peripheral slot around each wing, between the latter and the periphery of the corresponding opening; and
- an elongate seal, fixed to the periphery of said ventral fairing and to the periphery of each opening, so as to shut off said first and second slots, respectively, said seal comprising:
  - a longitudinal elastic end lip able to be applied, via the inner face of its free end, respectively against said fuselage or said flying surface; and
  - an additional longitudinal leaktightness member, carried by the inner face of said seal set back with respect to said end lip and also able to be applied against said fuselage or said flying surface, respectively, is noteworthy in that said additional longitudinal leaktightness member is a radially elastic bead.

Thus, by virtue of the present invention, numerous advantages are obtained:
- said radially elastic bead, carried by the inner face of the seal, is always correctly presented with respect to the fuselage or to the wings, during installation, being unable to turn over, as did the inner lip, which it replaces; and
- said radially elastic bead, when it is applied against the fuselage or the flying surface of the aircraft, deforms and flattens, so forming a wide bearing surface, incapable of vibrating as did said inner lip. Moreover, this wide bearing surface ensures excellent leaktightness, so that the detachment and the onset of vibration of the free end of the end lip are if not completely eliminated, at least greatly reduced.

To reduce yet further, and even to completely do away with the vibrations of said end lip, it is advantageous, in accordance with another feature of the present invention, made possible by the fact of the excellent leaktightness afforded by said radially elastic bead, for said inner face of the free end of said end lip to comprise, at least on a part of said seal, at least one abutment boss, able to keep said end lip locally separated from said fuselage or from said wing, respectively, so as to contrive a controlled leakage of air which can pass through said first and second slots, in the case of a possible occasional and/or momentary defect of leaktightness of said bead.

Of course, the height of each boss and the number of said bosses, as well as their distribution, are determined, by calculation or by experiment, so that the leakage air flow rate between said bosses gives rise to little nuisance drag, while ensuring a low level of vibrations of said end lip of the seal.

Depending on the geometry of the fuselage, of the flying surface and of the ventral fairing of the aircraft, the pressure coefficient on the side of certain parts of the airfoil top surface of the wings may be very negative, this being representative of a very low pressure, so that any vibrations of the free end of the elastic end lip could, at these locations, have a large amplitude. It is therefore advantageous to apply the seal in accordance with the present invention at least facing said airfoil top surface parts at which the value of the pressure coefficient is strongly negative.

Of course, the present invention also relates to this kind of elongate seal for aircraft whose additional longitudinal leaktightness member is a radially elastic bead.

Moreover, the inner face of the free end of said end lip may comprise, at least on a part of said seal, at least one abutment boss, able to keep said end lip locally separated from the fuselage or from the flying surface, respectively, so as to contrive a controlled leakage of air which can pass through said first and second slots.

In order, at the same time, to ensure good presentation of said radially elastic bead during installation of the seal and good leaktightness of said seal after installation, it is preferable for the stiffness of said radially elastic bead to be greater on the side of the inner face of said seal than on the side of the free part of said seal able to be applied against said fuselage or the flying surface.

Accordingly, in particular, it is advantageous for said radially elastic bead to be tubular. In this case, in order to ensure correct bearing of said bead against the fuselage or the flying surface, it may be advantageous for the two lateral parts of said tubular bead, joining respectively the inner face of said seal to the free part of said bead which is able to be applied against said fuselage or the flying surface, to exhibit different stiffnesses.

Such variations in stiffness may be obtained through variations in constitutive material or through variations in thickness of the wall of said tubular bead, these variations in thickness possibly themselves resulting from the mutual off centering and/or mutual ovalization of the internal passage of the tubular bead with respect to the latter's wall.

In a first embodiment, the seal in accordance with the present invention comprises a flat longitudinal part intended for the fixing of said seal to said ventral fairing and this flat longitudinal fixing part is disposed at the opposite end of said seal to said longitudinal elastic end lip, said radially elastic bead lying in an intermediate position between said longitudinal elastic end lip and said flat longitudinal fixing part. Such a seal is especially appropriate to the shutting off of said second slot between said ventral fairing and the flying surface.

As a variant, according to a second embodiment, the seal in accordance with the present invention likewise comprises a flat longitudinal part intended for the fixing of said seal to said ventral fairing, but this flat longitudinal fixing part is disposed in an intermediate position between said longitudinal elastic end lip and said radially elastic bead. The seal according to the invention is then especially appropriate to the shutting-off of said first slot between the ventral fairing and the fuselage.

Regardless of its embodiment, it is advantageous for the seal in accordance with the present invention to comprise a blade-shaped longitudinal recess made in the outer face of said flat longitudinal fixing part and serving as housing for the corresponding peripheral edge of said ventral fairing.

Preferably, the seal of the invention is made, by extrusion or by molding, in the form of a strip section or of a monolithic closed loop, for example made of a fiber reinforced elastomer.

BRIEF DESCRIPTION OF THE DRAWINGS

The figures of the appended drawing will elucidate the manner in which the invention may be embodied. In these figures, identical references designate similar elements.

DESCRIPTION OF THE PREFERRED EMBODIMENTS

Figure 1:
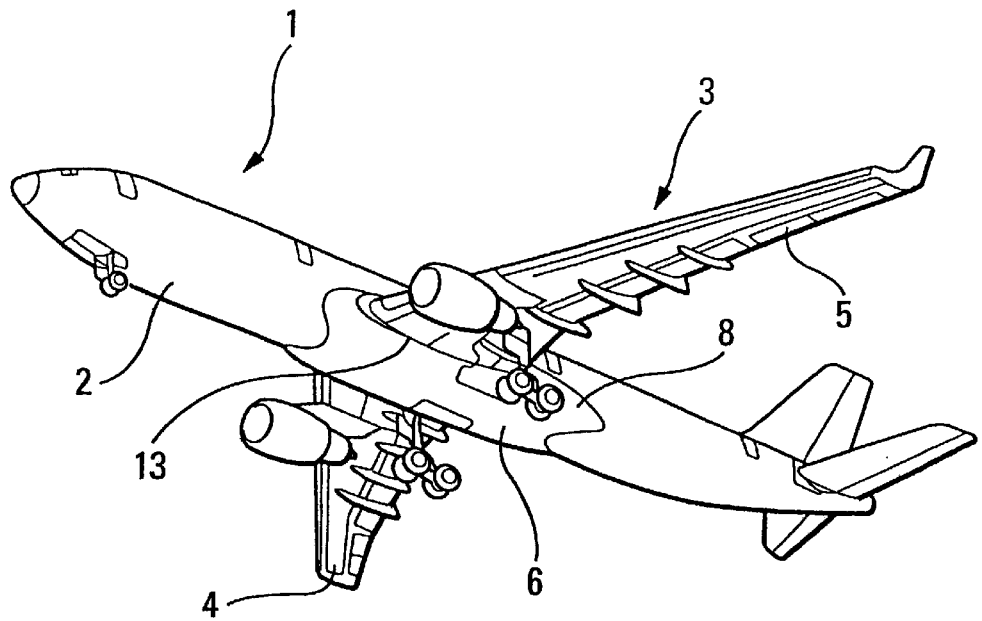
FIG. 1 is a diagrammatic perspective view from below of an aircraft provided with a ventral fairing.
Figure 2:
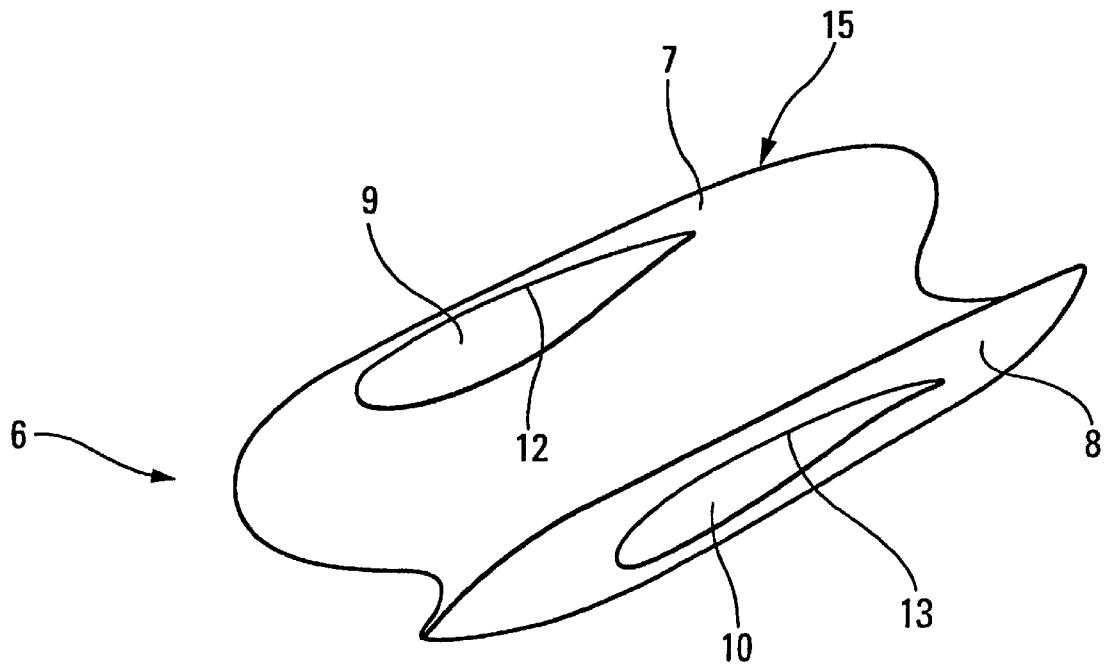
FIG. 2 is a diagrammatic perspective view from above of said ventral fairing, parted from said aircraft and stripped of the internal elements of which it is composed.

The aircraft 1 represented diagrammatically in FIG. 1 comprises, in a known manner, a fuselage 2, a fixed flying surface 3 comprising two wings 4 and 5 opposite one another with respect to said fuselage 2, a cradle-shaped ventral fairing 6 which is fixed to the lower part of said fuselage 2, at the crossover of the latter with said flying surface 3, and which projects downward with respect to the belly of said aircraft. Such a cradle possesses two longitudinal flanges 7 and 8 climbing laterally along said fuselage 2 (see also FIG. 2), said flanges 7 and 8 being provided, each, with an opening 9 or 10 for the passage of the corresponding wing 4 or 5.

Figure 3:
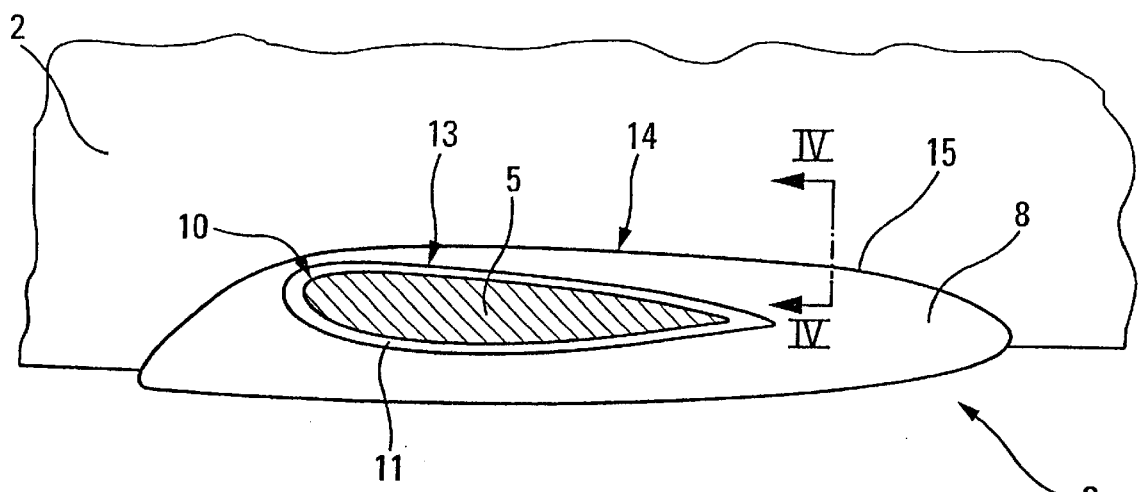
FIG. 3 is a diagrammatic lateral view, on a larger scale, of the ventral fairing fitted to the aircraft and traversed by a wing, before the mounting of the seal in accordance with the present invention.
Figure 4:
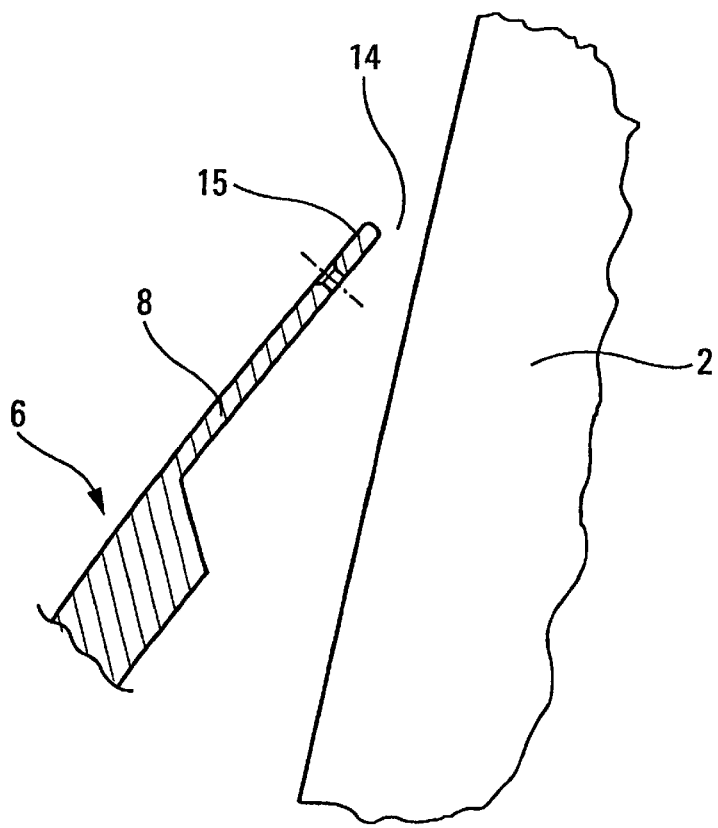
FIG. 4 is an enlarged partial diagrammatic sectional view along the line IV—IV of FIG. 3, before the mounting of the seal in accordance with the present invention.
Figure 5:
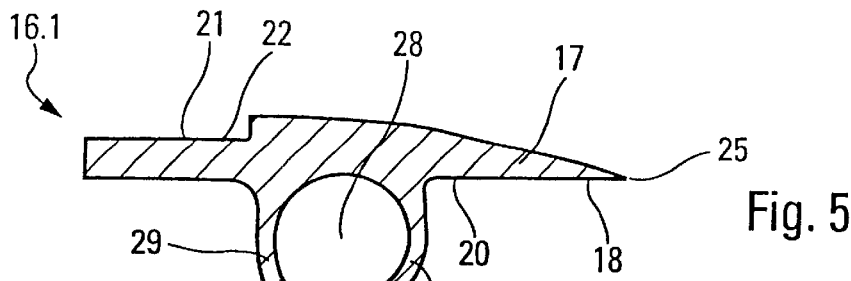
FIGS. 5 to 9 illustrate, in enlarged diagrammatic cross section, five exemplary embodiments of the seal in accordance with the present invention.

After fixing the ventral fairing 6 to the fuselage 2, there is:

a peripheral slot 11 around each wing 4 or 5 between the latter and the periphery 12 or 13 of the opening 9 or 10, as is illustrated in FIG. 3; and a peripheral slot 14 around said ventral fairing 6 between the periphery 15 of the latter and the fuselage 2, as illustrated in FIG. 4.

The subject of the present invention is an elongate seal 16, possibly forming a closed loop, for example made of a reinforced elastomer and intended to be fixed to the periphery 12, 13 of each opening 9, 10 and to the periphery 15 of the ventral fairing 6, so as to shut off said peripheral slots 11 and 14.

Figure 10:
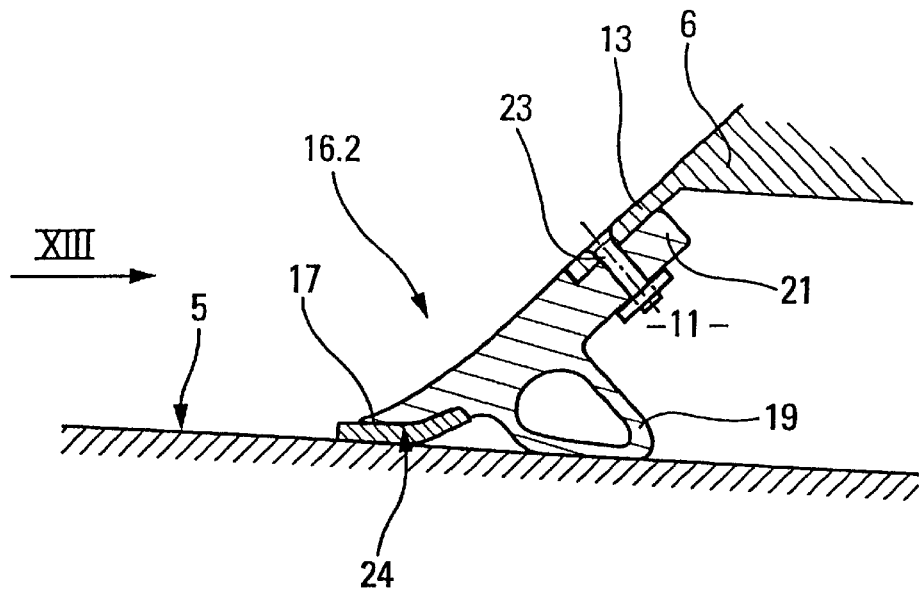
FIG. 10 represents, in enlarged diagrammatic cross section, the seal of FIG. 6, installed on the ventral fairing so as to shut off the slot between the latter and a wing of the aircraft.
Figure 11:
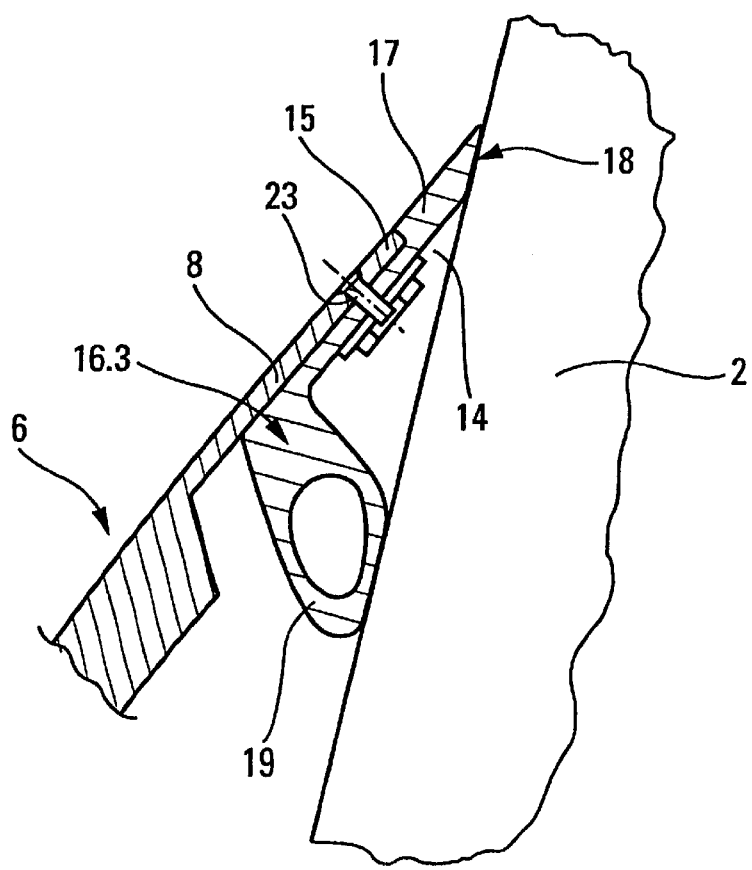
FIG. 11 represents, in enlarged diagrammatic cross section, the seal of FIG. 7, installed on the ventral fairing so as to shut off the slot between the latter and the fuselage of the aircraft.
Figure 12:
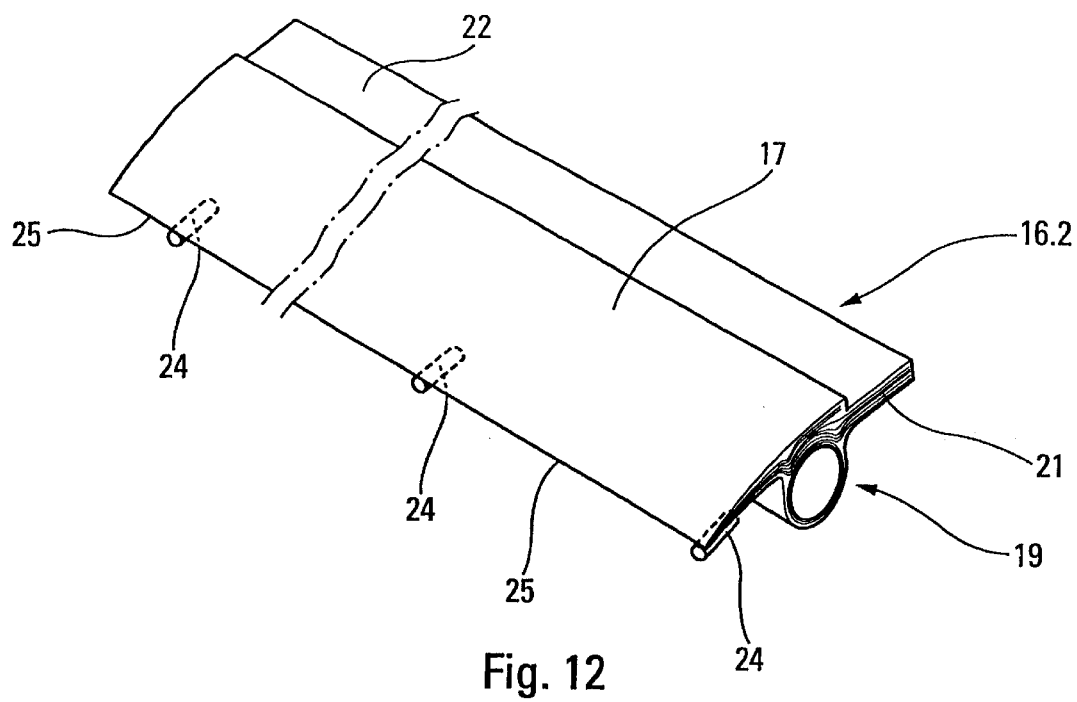
FIG. 12 represents in perspective from above the seal in accordance with the present invention, shown by FIGS. 6 and 10, but not yet fixed to the ventral fairing.

In FIGS. 5 to 9 are illustrated in section five exemplary embodiments 16.1 to 16.5 of the seal 16. As may be seen in these figures, regardless of the embodiment 16.1 to 16.5, the seal 16 comprises:

- a longitudinal elastic end lip 17, forming one of the longitudinal edges of said seal, said lip 17 being able, as is illustrated by FIGS. 10 and 11, to be applied via the inner face 18 of its free end against the flying surface 3, 4, 5 or against the fuselage 2;
- a radially elastic bead 19, carried by the inner face 20 of the seal 16 set back with respect to the end lip 17 and also able to be applied against the fuselage 2 or the flying surface 3 by flattening and thereby offering a wide bearing surface (see FIGS. 10 and 11) and hence excellent leaktightness; and
- a flat longitudinal part 21 intended for the fixing of the seal 16 to the ventral fairing 6.

It will be noted, that in the exemplary embodiments 16.1 and 16.2, said fixing part 21 forms the edge of said seal away from the lip 17, the bead 19 then being in an intermediate position between the lip and said fixing part 21. On the other hand, in the exemplary embodiments 16.3, 16.4 and 16.5, said fixing part 21 is disposed in an intermediate position between the lip 17 and the bead 19.

Moreover, on its outer face, said fixing part 21 comprises a blade-shaped longitudinal recess 22, able to serve as housing for the corresponding peripheral edge 12, 13 or 15 of the ventral fairing 6. The fixing of the seal 16 to the ventral fairing 6 is achieved via screws or the like 23 passing through said peripheral edge 12, 13, 15 and said fixing part 21 (see FIGS. 10 and 11).

Figure 6:
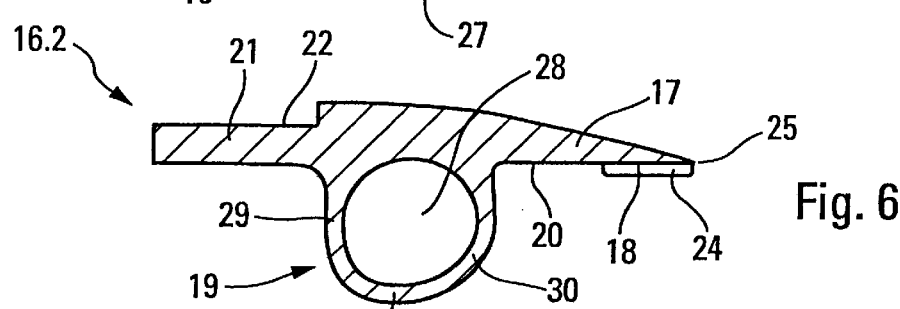
Figure 7:
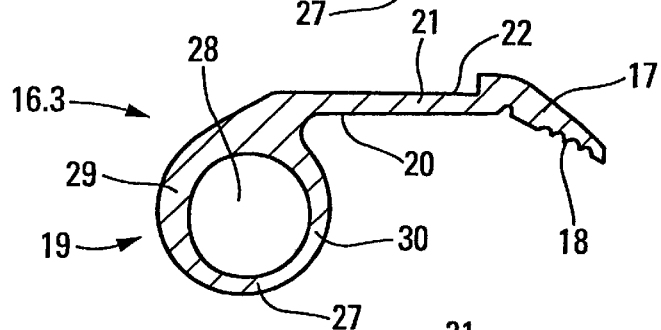
Figure 8:
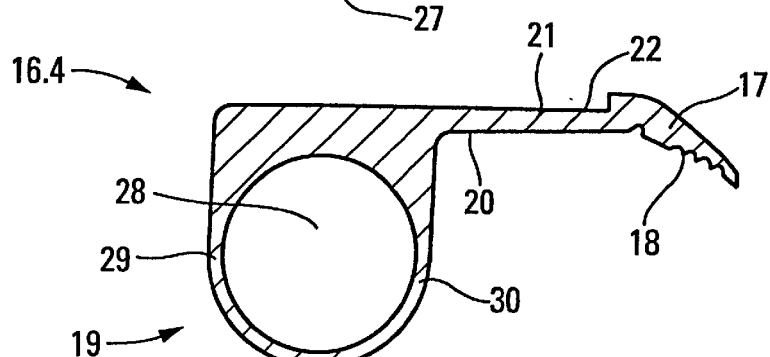
Figure 9:
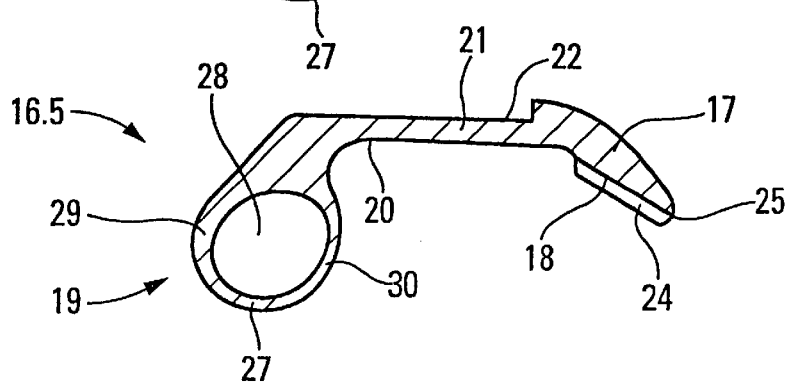
Figure 13:
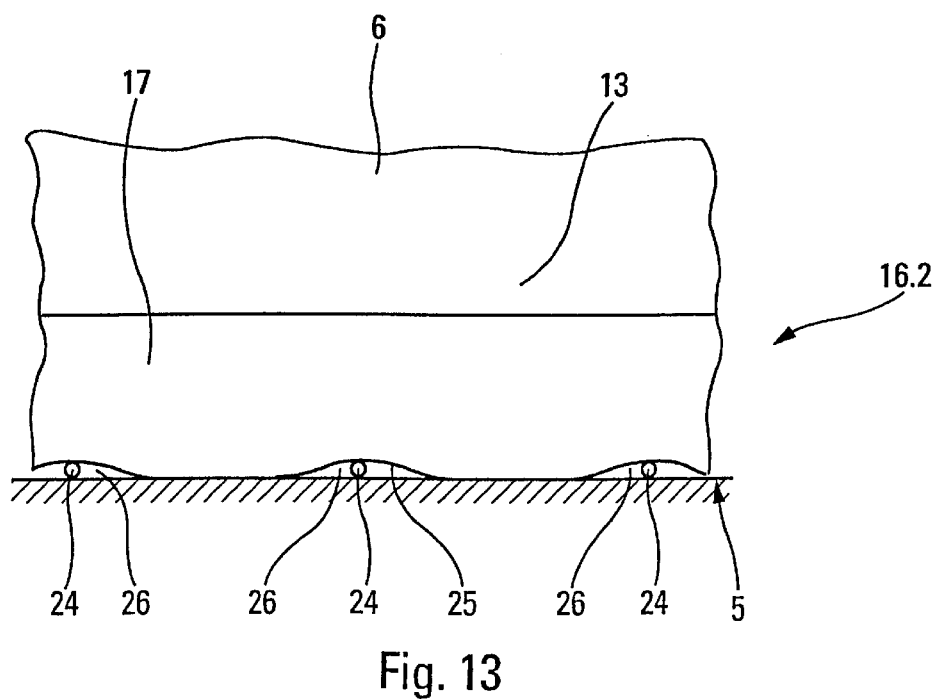
FIG. 13 corresponds to an end-on view on the arrow XIII of FIG. 10.

In the exemplary embodiments 16.2 and 16.5 represented in FIGS. 6 and 9, the inner face 18 of the lip 17 comprises spaced abutment bosses 24, intended to be positioned facing at least a part of the fuselage 2 or the flying surface 3. Such bosses 24 keep the end edge 25 of the lip 17 locally separated from the fuselage 2 or from the flying surface 3 so as to contrive spaces 26, engineering a controlled and calibrated leakage of air passing through the slots 11 or 14, in the case of a possible defect of leaktightness of the bead 19 (see FIG. 13).

The pressure coefficient over certain parts of the airfoil top surface of the flying surface 3 being able to take strongly negative values, it is on the side of these parts that it is advantageous to apply a leaktightness seal of this kind. Thus, when the pressure of the air between the airfoil bottom surface and the airfoil top surface of the flying surface 3 reaches a value high enough to detach the bead 19, air passes between the latter and the fuselage and/or the flying surface, respectively, and results in a leakage which is calibrated and controlled by the spaces 26. The height of the abutment bosses 24, their number and their distribution along the free end 25 are determined so that the flow rate of the air leakage through the spaces 26 gives rise to little nuisance drag, while ensuring a low level of vibrations for the lip 17.

To ensure good presentation of the bead 19 facing the fuselage 2 or the flying surface 3 during the installation of said bead in said slots 11 and 14, it is advantageous for said bead to exhibit a relatively significant stiffness in the vicinity of the inner face 20 of the seal 16. On the other hand, to ensure good leaktightness, the free part 27 of said bead intended to be applied against the fuselage 2 or the flying surface 3 is relatively flexible.

To able to adapt these stiffness difference requirements, it is preferable for the bead 19, which could however be solid, to be tubular, exhibiting an internal passage 28.

Thus, by altering the shape and/or the off-centering of said internal passage 28, it is easy to locally vary the thickness of the wall of the tubular bead 19, and hence the stiffness of the latter, as is illustrated in FIGS. 5 to 9.

For example, to further improve the presentation of the bead 19 on installation and the leaktightness afforded thereby, the two lateral parts 29 and 30 of said bead 19, joining respectively the inner face 20 of the seal 16 to the free part 27 of the bead, exhibit different stiffnesses.

It will be readily understood that the seal 16 in accordance with the present invention can exhibit either the form of a band (strip section), or that of a closed loop.

What is claimed is:

1. An aircraft comprising:
   a fuselage and a fixed flying surface comprising two wings opposite one another with respect to said fuselage;
   a cradle-shaped ventral fairing, fixed with play to the lower part of said fuselage, at the crossover of the latter with said flying surface and provided with two longitudinal flanges climbing laterally along said fuselage, said longitudinal flanges being provided, each, with an opening for the passage with play of the corresponding wing in such a way as to form:
   a first peripheral slot around said ventral fairing, between the latter and said fuselage; and
   a second peripheral slot around each wing between the latter and the periphery of the corresponding opening; and
   an elongate seal, fixed to the periphery of said ventral fairing and to the periphery of each opening, so as to shut off said first and second slots, respectively, said seal comprising:
   a longitudinal elastic end lip able to be applied, via the inner face of its free end, respectively against said fuselage or said flying surface; and
   an additional longitudinal leaktightness member, carried by the inner face of said seal set back with respect to said end lip and also able to be applied against said fuselage or said flying surface, respectively,
   wherein said additional longitudinal leaktightness member is a radially elastic bead.

2. The aircraft as claimed in claim 1, wherein said inner face of the free end of said end lip comprises, at least on a part of said seal, at least one abutment boss, able to keep said end lip locally separated from the fuselage or from the flying surface, respectively, so as to contrive a controlled leakage of air which can pass through said first and second slots, in the case of a possible defect of leaktightness of said bead.

3. The aircraft as claimed in claim 2, wherein said seal is applied at least on the side of those parts of the airfoil top surface at which the value of the pressure coefficient is strongly negative.

4. A seal for an aircraft comprising:
   a fuselage and a fixed flying surface comprising two wings opposite one another with respect to said fuselage; and
   a cradle-shaped ventral fairing, fixed with play to the lower part of said fuselage, at the crossover of the latter with said flying surface and provided with two longitudinal flanges climbing laterally along said fuselage, said longitudinal flanges being provided, each, with an opening for the passage with play of the corresponding wing, in such a way as to form:
- a first peripheral slot around said ventral fairing, between the latter and said fuselage; and
- a second peripheral slot around each wing, between the latter and the periphery of the corresponding opening;

said seal being elongate and being fixed to the periphery of said ventral fairing and to the periphery of each opening, so as to shut off said first and second slots, respectively, said seal comprising:
- a longitudinal elastic end lip able to be applied, via the inner face of its free end, respectively against said fuselage or said flying surface; and
  - an additional longitudinal leaktightness member, carried by the inner face of said seal set back with respect to said end lip and also able to be applied against said fuselage or said flying surface, respectively,
  - wherein said additional longitudinal leaktightness member is a radially elastic bead.

5. The seal for aircraft as claimed in claim 4, wherein said inner face of the free end of said end lip comprises, at least on a part of said seal, at least one abutment boss, able to keep said end lip locally separated from the fuselage or from the flying surface, respectively, so as to contrive a controlled leakage of air which can pass through said first and second slots, in the case of a possible defect of leaktightness of said bead.

6. The seal for aircraft as claimed in claim 4, wherein said bead is tubular.

7. The seal for aircraft as claimed in claim 4, wherein the stiffness of said radially elastic bead is greater on the side of the inner face of said seal than on the side of the free part of said seal able to be applied against said fuselage or the flying surface.

8. The seal for aircraft as claimed in claim 6, wherein the two lateral parts of said tubular bead, joining respectively the inner face of said seal to the free part of said bead which is able to be applied against said fuselage or the flying surface, exhibit different stiffnesses.

9. The seal for aircraft as claimed in claim 7, wherein the variations in stiffness of said radially elastic bead are obtained through variations in thickness of the wall of said bead.

10. The seal for aircraft as claimed in claim 4, which comprises a flat longitudinal part intended for the fixing of said seal to said ventral fairing and wherein said flat longitudinal fixing part is disposed at the opposite end of said seal to said longitudinal elastic end lip, said radially elastic bead lying in an intermediate position between said longitudinal elastic end lip and said flat longitudinal fixing part.

11. The seal for aircraft as claimed in claim 4, which comprises a flat longitudinal part intended for the fixing of said seal to said ventral fairing and wherein said flat longitudinal fixing part is disposed in an intermediate position between said longitudinal elastic end lip and said radially elastic bead.

12. The seal for aircraft as claimed in claim 10, which comprises a blade-shaped longitudinal recess made in the outer face of said flat longitudinal fixing part and serving as housing for the corresponding peripheral edge of said ventral fairing.

* * * * *